United States Patent [19]

Pratt et al.

[11] Patent Number: 4,907,733
[45] Date of Patent: Mar. 13, 1990

[54] METHOD FOR ATTACHING CARBON COMPOSITES TO METALLIC STRUCTURES AND PRODUCT THEREOF

[75] Inventors: Wilson N. Pratt, Anaheim; Robert M. Haner, Upland, both of Calif.

[73] Assignee: General Dynamics, Pomona Division, Pomona, Calif.

[21] Appl. No.: 173,792

[22] Filed: Mar. 28, 1988

[51] Int. Cl.$^4$ .......................... B64C 3/20; B64C 3/26; B23K 31/02
[52] U.S. Cl. .................................... 228/122; 228/124; 228/177; 228/179; 228/205; 228/209; 228/215; 228/263.12; 427/113; 427/114; 204/23; 204/49; 244/131; 244/133
[58] Field of Search ............... 228/209, 122, 124, 177, 228/179, 180.1, 205, 208, 215, 263.12; 29/DIG. 12; 204/23, 27, 49; 244/123, 131, 133; 416/230; 427/113, 114

[56] References Cited

U.S. PATENT DOCUMENTS

| | | |
|---|---|---|
| 2,509,020 | 5/1950 | Stauffer et al. . |
| 2,509,021 | 5/1950 | Settle . |
| 2,996,401 | 8/1961 | Welch et al. . |
| 3,321,019 | 5/1967 | Dmitroff et al. . |
| 3,862,488 | 1/1975 | Pessell et al. . |
| 4,120,998 | 10/1978 | Olez . |
| 4,228,976 | 10/1980 | Eiselbrecher et al. . |
| 4,321,011 | 3/1982 | Hori et al. . |
| 4,382,712 | 5/1983 | Buchs et al. ........................ 244/131 |
| 4,556,591 | 12/1985 | Bannink, Jr. ........................ 244/131 |
| 4,636,142 | 1/1987 | Baranski . |
| 4,713,149 | 12/1987 | Hoshino ............................. 204/23 |

Primary Examiner—Richard K. Seidel
Assistant Examiner—Samuel M. Heinrich
Attorney, Agent, or Firm—Henry Bissell; Leo R. Carroll

[57] ABSTRACT

A method is disclosed for creating a strong point for the attachment of carbon composites to metallic bodies that is suitable at high temperatures (1600° F.) as well as ambient temperatures. A pocket of suitable dimensions and depth is molded into the carbon composite structure on both sides at an edge, with the edge relieved and rounded. A hole for a fastening member is molded or drilled in the approximate center of the pocket. After preparation of the surface the pocket, through hole, and relieved edge are nickel-plated to produce a rigid strong point. A doubler can be brazed to the nickel plate to strengthen the bond. The disclosed method can be used for attaching any type of electrically conductive composite material to a metallic structure.

14 Claims, 2 Drawing Sheets

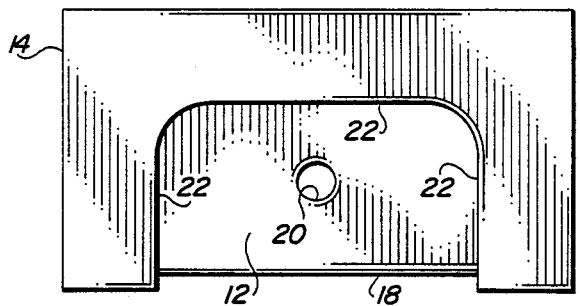
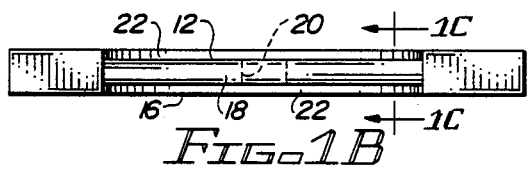
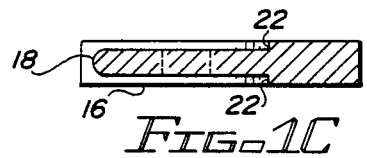
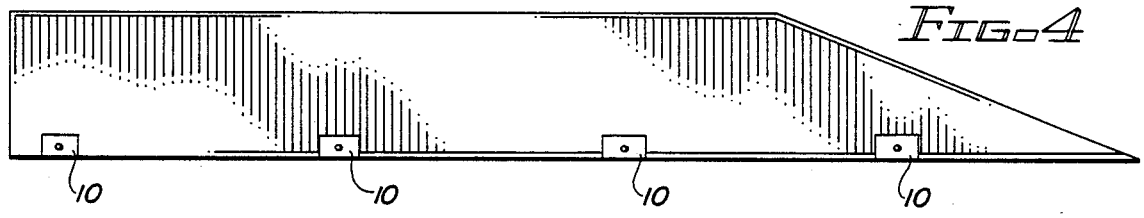
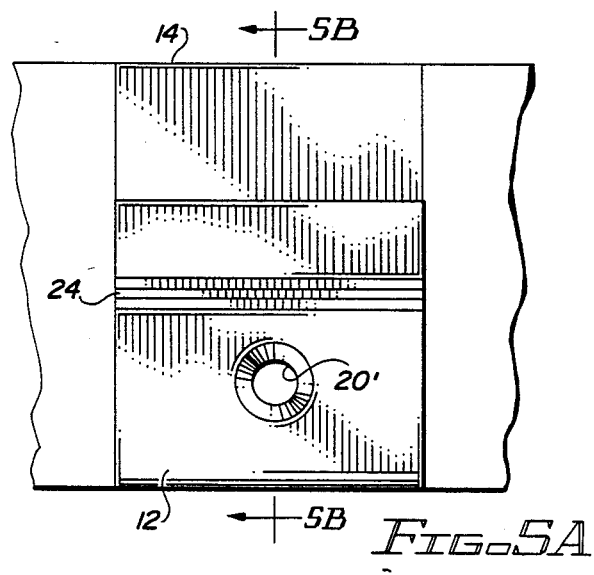
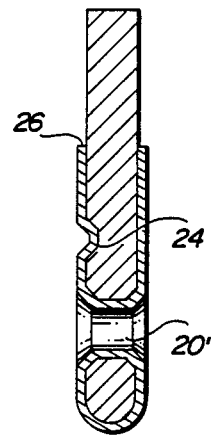

METHOD FOR ATTACHING CARBON COMPOSITES TO METALLIC STRUCTURES AND PRODUCT THEREOF

REFERENCE TO RELATED APPLICATION

The present application is related to an application Ser. No. 07/173,787 entitled "High-Temperature Tensile Test Specimen and Methods of Fabrication," of W. N. Pratt, filed concurrently herewith and assigned to the assignee of the present application.

BACKGROUND OF THE INVENTION

1. Field of the Invention

The present invention relates to methods of attaching composite materials to metallic materials and, more particularly, to methods of attaching carbon composites to metallic structures and to products produced by such methods.

2. Description of the Related Art

Composite materials produced by embedding fibers in the form of staple, filament, or yarn in a matrix of plastic, metal, or ceramic have found many uses in engineering applications requiring high strength and low weight, as in aeronautics and astronautics. Fibers retaining high strength at elevated temperatures are valuable in high-temperature applications. Carbon and graphite fibers fall into this category. Because the element carbon has the ability to form strong bonds between its atoms, carbon atoms are capable of holding together in strings to form long unidimensional polymer structures in the same way that molecules from the basic structural units of fibers. The fibers used in textiles are based almost exclusively on organic polymers consisting of long chains of carbon atoms with other atoms or groups of atoms attached as appendages to the carbon "spine." By removing the appendages from an organic fiber molecule, long molecules consisting entirely of carbon atoms can be produced. When chemical stripping of the appendages is carried out on a highly oriented organic fiber, carbon fibers in which the molecules have a high degree of orientation can be obtained. Carbon fibers of this sort may be produced by subjecting organic fibers to pyrolysis. Carbon fibers are formed at lower temperatures; at higher temperatures the carbon atoms in the fiber are arranged in the crystalline form of graphite.

Carbon fibers have a high strength-to-weight ratio and retain high strength at temperatures at which other engineering materials suffer significant loss of strength. Composite materials containing carbon fibers have many uses in the construction of aircraft and spacecraft. They are used in deep-sea vessels, in heavy-duty bearings, in pressure containment chambers, and in making the compressor turbine blades in jet engines. In these applications it is often desirable to make strong joints between composite materials and metal structures. Some examples of the art related to methods of joining composite materials and metals are described briefly below.

U.S. Pat. No. 2,509,020 to Stauffer et al. relates to an improved electrical contact brush member having a carbonaceous material portion with a metal terminal clip member attached thereto by an improved securing arrangement. A bond between the terminal clip member and the brush member is obtained by forming a coating of low electrical resistance metal, such as copper, over the contacting surface of the brush member. The coating may be formed by spraying fine particles of molten copper over the surface of the member adapted to be engaged by the terminal member. An alloying metal such as tin or zinc is then applied over the surface of the terminal member and a further mechanical connection between the terminal and brush members is formed by welding a connector between them.

U.S. Pat. No. 2,509,021 to Settle relates to electrical contact members and an improved method of making them. In a variation of the above-described patent to Stauffer et al., a two-part rivet is welded together to join the brush member to the terminal member by the passage of an electrical current therethrough.

U.S. Pat. No. 2,996,401 to Welch et al. is directed to a method of making ceramic structures for electron tubes in which a metallizing layer is firmly bonded to the ceramic. The metallizing layer is prepared by mixing powdered manganese and titanium with a powdered metal selected from the group consisting of molybdenum and tungsten. The resulting composition is brushed, sprayed, printed or otherwise applied to the desired area of the ceramic and then fired in an atmosphere furnace.

U.S. Pat. No. 3,321,019 to Dmitroff et al. is directed to the construction and method of construction of the root end of helicopter blades made of plastic reinforced with woven fiberglass cloth. A series of thin metal shims, plates, or inserts are embedded in the plastic blade root extending parallel to the blade chord. At least one ply of plastic impregnated woven fiberglass cloth is positioned between the metal laminates and is adhesively bonded thereto and extends therefrom into the remainder of the blade. Blade retaining bolts pass through holes in the blade root perpendicular to the chord so that blade loads are transmitted into the metal plates in shear and are then transmitted into the retaining bolts and into the blade retaining means.

U.S. Pat. No. 3,862,488 to Pessell et al. relates to a method of making a ceramic-to-metal joint in which a metal is brazed to a molybdenum metallized ceramic after first coating the molybdenum with palladium. The palladium is preferably plated onto the molybdenum by a chemical displacement process.

U.S. Pat. No. 4,120,998 to Olez relates to a composite structure comprising a beam formed by inserting two stepped metal end caps of a graphite/epoxy B-staged tubular strut. Multidirectional and unidirectional fibers are subsequently laid up to provide a structure which is in turn cocured to result in a unitized composite winged trunnion structure.

U.S. Pat. No. 4,228,976 to Eiselbrecher et al. is directed to an air foil or wing connected to the body of an aircraft or spacecraft through a main connector comprising metal and non-metal components. Pressure bodies and tension loops are arranged in a metal grommet for introducing pressure and tension forces into the outer skin of the wing as well as into the internal structure of the wing box. The metal grommet is in turn centered to and integrated with a main connector bearing bushing.

U.S. Pat. No. 4,321,011 to Hori et al. relates to a fan assembly with a hub portion, blades, and a stem being formed of molded plastics and made integral with each other. The stem is connected to an output shaft by means of bolts, each of which passes through a bushing. The bushing has a knurled portion of its outer surface and is inserted in a hole of the stem. The periphery of the hole is melted by heating upon insertion of the bushing therein so as to insure the connection of the fan assembly to the output member. If a spacer is interposed between the stem and a flange of the bushing, the spacer is fixedly connected to the bushing.

U.S. Pat. No. 4,636,142 to Baranski relates to a fan apparatus with a plurality of blade assemblies each of which has a molded plastic blade with an attachment insert partially embedded therewithin. The exposed portion of each attachment insert is rigidly attached to a corresponding one of the arms of a fan spider.

Other examples of related art are contained in the related application Ser. No. 07/173,787, entitled "High-Temperature Tensile Test Specimen and Method of Fabrication" by W. N. Pratt, assigned to the assignee of the present invention, the contents of which application are incorporated herein by reference.

None of the patents briefly described above discloses a method for attaching electrically conductive composite structures, such as those of carbon, to metallic structures by forming a pocket configuration along with a hole for a fastening member by a molding operation and thereafter plating the pocket area along with the hole walls with a nickel layer so as to provide a high strength area, with the possibility of brazing a metal structure to the nickel-plated composite.

SUMMARY OF THE INVENTION

A method is disclosed for creating a strong point for the attachment of carbon composites to metallic bodies that is suitable at high temperatures (1600° F.) as well as ambient temperatures. A pocket of suitable dimensions and depth is molded into a carbon composite structure on both sides at an edge. The edge in the region of the pocket is relieved to approximately the same depth as the depth of the pocket and the relieved edge is rounded. A hole for a fastening member (such as a bolt) is molded or drilled in the approximate center of the pocket in the composite structure. The pocket and hole are then vapor blasted to remove loose matter and to produce a surface that will enhance adhesion. Next the composite body is masked except for the pockets and the hole, and a narrow insulating strip is attached just inside the outline of the pocket. The pockets, the through hole, and the relieved edge are then nickel plated to an appropriate thickness to produce a rigid strong point holding the composite in place at high temperatures. A doubler can be brazed to the nickel plate to strengthen the bond. A high-temperature braze could be employed for applications in which the bond must survive high temperatures. The disclosed method can be used for attaching any type of electrically conductive composite material to a metallic structure.

BRIEF DESCRIPTION OF THE DRAWING

A better understanding of the present invention may be realized from a consideration of the following detailed description, taken in conjunction with the accompanying drawings in which:

FIGS. 1A-1C are orthographic views (1C being in section) of a rectangular plate of carbon composite material with a plating pocket in accordance with the present invention;

FIG. 4 is a side view of a carbon composite missile fin with a plurality of spaced strong points for attachment to a metal missile body; and FIGS. 5A and 5B are partial plan and edge views in section, respectively, of a nickel-plated strong point in a carbon composite material fabricated in accordance with the invention.

DESCRIPTION OF THE PREFERRED EMBODIMENTS

Figure 2:
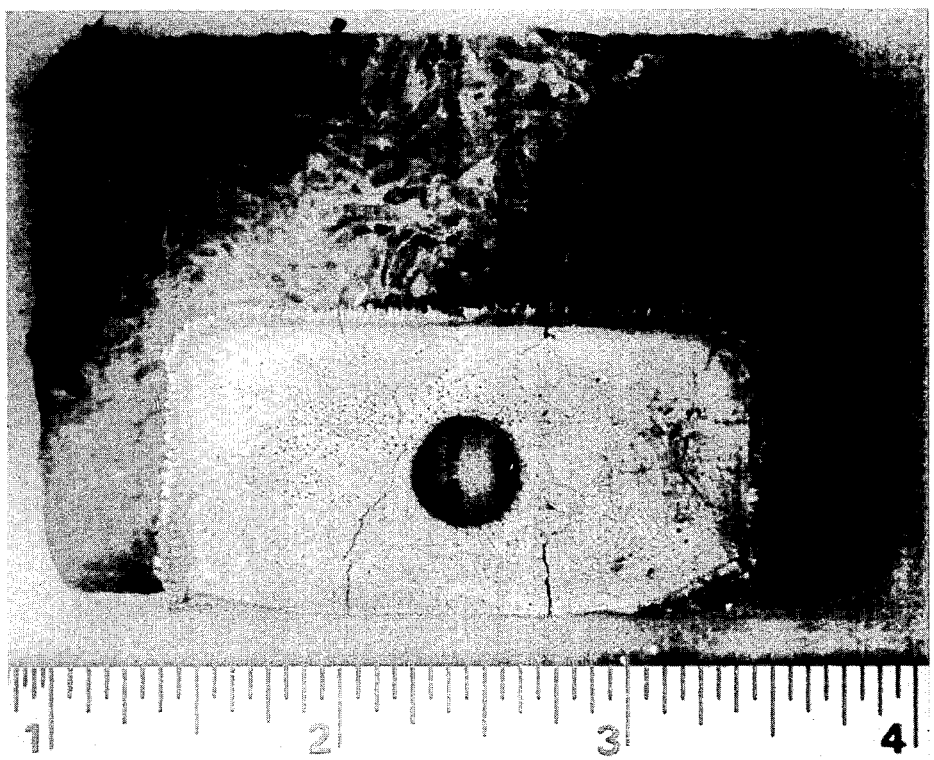
FIG. 2 is a reproduction of a photograph of a nickel-plated pocket and hole in a carbon/carbon composite material after being heated for one hour at 1650° F. in air, produced in accordance with the present invention.

The present invention provides methods for attaching carbon composite materials to metallic structures and includes products of the methods. Nickel-plated strong points 10 in the composite material are fabricated to which a metallic structure can be either bolted or brazed. The strong points created will survive exposure to high temperatures (1600° F.). Corresponding elements utilizing previously known methods of attachment have been found to fail at these high temperatures.

The process begins with molding a pocket of suitable dimensions and depth into a carbon composite structure. As shown in FIGS. 1A-1C, a pocket 12 consists of a recessed area in a carbon composite part 14. As shown in FIGS. 1B and 1C, there is a pocket area 16 on the opposite side of part 14 also. A typical value for the recess depth is 0.030 inch, and edge 18 is relieved to approximately this same depth. Relieved edge 18 is formed into a cylindrical section as shown in FIG. 1C to prevent edge build-up in a later plating step. A through hole 20 for a fastening member such as a bolt is molded or drilled in the approximate center of pocket 12 in the composite structure 14.

Pockets 12 and 16 and hole 20 are vapor blasted to clean the surface and roughen it for better adhesion. The vapor blasting is done using water carrying fine alumina particles. A particle size of 280 mesh can be conveniently used. The blasting process removes loose material from the surface and roughens it in preparation for the plating step in the process.

Because the carbon composite and nickel have such different coefficients of thermal expansion, space must be allowed for expansion of the plated-on nickel with temperature. An insulating barrier shim (not shown) approximately 0.030 inch thick is attached to the sides 22 of pockets 12 and 16 before the plating step and removed afterwards to leave a gap between the plated nickel and the carbon composite material inside the outlines of pockets 12 and 16.

Composite body 14 is masked except for pockets 12, 16, edge 18, and hole 20 before the plating process begins. Nickel is electroplated to a thickness of about 0.30 inch on pockets 12, 16, relieved edge 18, and the inner walls of hole 20 by an electroplating process which is known in the art. Nickel sulfonate is a suitable type of plating solution to use. The result, as illustrated in FIG. 2, is a rigid strong point for holding the composite in place at high temperatures. FIG. 2 shows plated strong point in a carbon/carbon composite material after a one-hour exposure at 1600° F. in air.

Because nickel expands at a considerably faster rate with temperature than does carbon, the adherence of the nickel plate to the carbon composite material is probably largely mechanical. The surface area inside the through hole is probably an important factor in determining the strength of the reinforcement obtained by the present method. It follows that increasing the surface area inside the through hole 20 will provide a better strong point. This can be done, for example, by countersinking both sides of the hole before the plating takes place.

Figure 3:
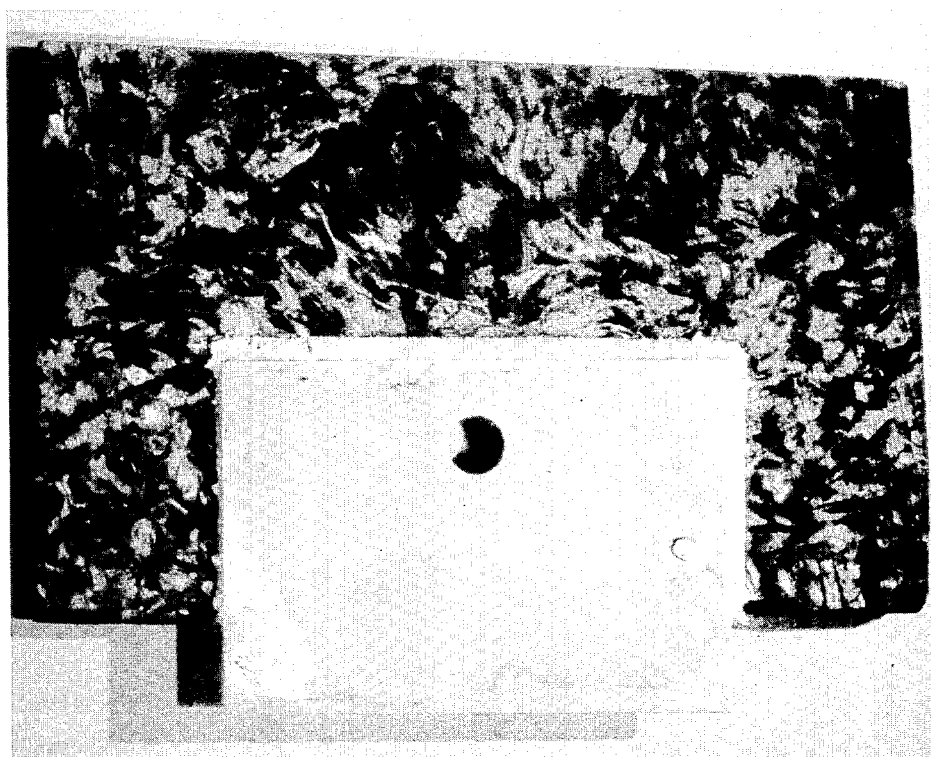
FIG. 3 is a reproduction of a photograph of a steel doubler brazed to a nickel-plated carbon/carbon composite sample in air with a torch.

A steel doubler may be successfully brazed to a nickel-plated strong point in a carbon composite material produced according to the present invention, as shown in FIG. 3. The brazing of the steel doubler shown in FIG. 3 was done in air with a torch. Because the disparity in the thermal expansion rates of carbon and nickel would cause serious mismatches in long structures such as missile dorsal fins, the nickel plating could not be continuous in that case but rather would have to be applied at intervals where the attachments are to be made. FIG. 4 depicts a plurality of plated nickel pads 10 on a carbon composite missile dorsal fin allowing for attachment to a metallic missile body at spaced intervals.

FIGS. 5A and 5B depict an alternate arrangement in accordance with the present invention of a nickel-plated pocket area 12 with a molded-in through hole 20' which has a varying cross section similar to a hole in a machinable material that is countersunk from both sides. The diameter of the hole 20' decreases linearly from a maximum value at both exterior surfaces to a constant minimum value in the central part of the hole. In addition, a shallow groove 24 has been molded in the pocket area 12 on one side of the composite part 14 which provides additional holding strength for the plating 26 and compensates to some degree for the mismatch in the coefficients of thermal expansion of the carbon composite material and the nickel plating. Groove 24 has a depth sufficient to still hold the plating layer 26 after layer 26 has expanded with temperature. That is, from a consideration of the sectional view of FIG. 5B, it can be seen that as the outline of that part of the plating 26 above the hole 20' increases in the area it encloses, the plating that previously conformed tightly to the groove 24 is still partly held within it.

Although there have been described above specific arrangements of a nickel-plated strong point for attaching carbon composite components to metallic structures in accordance with the invention for the purpose of illustrating the manner in which the invention may be used to advantage, it will be appreciated that the invention is not limited thereto. Accordingly, any and all modifications, variations, or equivalent arrangements which may occur to those skilled in the art should be considered to be within the scope of the invention as defined in the annexed claims.

What is claimed is:

1. A method of fabricating a strong point on a carbon composite material comprising the steps of:
   forming a recessed pocket region along an edge of the composite material, said region extending to both sides of the material and around said edge portion to establish pockets on both sides joined by a recessed edge portion;
   forming at least one through hole in said region extending between the recessed surfaces of the two pockets on opposite sides of the composite; and
   plating a layer of nickel in said recessed pocket region to fill said pockets on opposite sides of the material to a level approximately flush with the surfaces of the material adjacent the pocket regions.

2. The method of claim 1 further including continuing said plated layer of nickel to coat the interior surface of said through hole.

3. The method of claim 2 further including the step of cleaning and roughening the recessed pocket region in preparation for the plating step.

4. The method of claim 3 further including electroplating each pocket of said recessed pocket region with a predetermined thickness of nickel.

5. The method of claim 3 further comprising the step of making said composite material except for said recessed pocket region and said through hole, and attaching a thin insulating shim strip on a ledge outlining said recessed region and substantially perpendicular thereto.

6. The method of claim 5 further including removing said shim strip to expose an unplated margin surrounding said recessed pocket region which accommodates thermal expansion of a nickel-plated layer left on said recessed pocket region by the plating step.

7. The method of claim 3 further including the step of forming said at least one through hole with a varying cross section between said recessed surfaces.

8. The method of claim 7 wherein said through hole is formed with a diameter that decreases linearly from a maximum value at both recessed surfaces to a constant minimum value in the central portion of the hole.

9. The method of claim 7 wherein said forming step comprises countersinking the through hole from the recessed surfaces at both ends of the hole.

10. The method of claim 2 further including securing a fastening member through each said through hole.

11. The method of claim 2 further including brazing a metallic structure to said composite material at each said strong point.

12. The method of claim 3 wherein the cleaning and roughening in steps are carried out by vapor blasting with water carrying alumina particles having a size of 280 mesh.

13. A method of attaching an electrically conducting composite material to a metallic structure comprising the steps of:
   (a) fabricating at least one strong point on said conducting composite material by plating a layer of nickel on a recessed pocket area having a through hole therein, said area being adjacent an edge of said composite material; and
   (b) fastening said metallic structure to said composite material at each said strong point;
   wherein step a) comprises the steps of:
   (a') cleaning and roughening each said area; and
   (b') electroplating each said area with a predetermined thickness of nickel; and
   further comprising a step (a") after a' of masking said composite material except for said recessed pocket area and said through hole, and attaching a thin insulating shim strip on a ledge outlining said recessed area and substantially perpendicular thereto, and an additional step (b") before (b') of removing said shim strip to expose an unplated margin surrounding said recessed area which accommodates thermal expansion of a nickel-plated layer left on said recessed area in step (b').

14. The method of claim 13 wherein said electroplating in step (b') is carried out in a nickel sulfonate bath.

* * * * *